United States Patent [19]

Lang

[11] 4,089,126
[45] May 16, 1978

[54] WRITING AND KINESTHETIC TEACHING DEVICE

[76] Inventor: Boris M. Lang, 519 Washington Rd., Woodbury, Conn. 06798

[21] Appl. No.: 762,762

[22] Filed: Jan. 26, 1977

[51] Int. Cl.$^2$ .......................................... G09B 11/00
[52] U.S. Cl. ...................................................... 35/36
[58] Field of Search ................. 35/36, 37, 26; 272/93, 272/67, 116

[56] References Cited

U.S. PATENT DOCUMENTS

| | | | |
|---|---|---|---|
| 3,238,643 | 3/1966 | O'Connor | 35/36 |
| 3,536,325 | 10/1970 | Raba | 35/36 X |
| 3,731,402 | 5/1973 | Paul | 35/37 |
| 3,740,872 | 6/1973 | Mayo | 35/37 |

*Primary Examiner*—William H. Grieb

[57] ABSTRACT

Write Right Tool is a novel and useful apparatus designed to instill the right habits of writing in the mind and reflexes of a little child (3½ and up). At the same time, the usual procedure of teaching reading is canceled, making it a by-product of writing. The operation of the tool described below, makes for unusually powerful and prolonged concentration of all involved faculties of the child. At the same time, the use of the tool prevents the often met with complications of dyslexia and the need for remedial courses in writing and reading.

The progress of learning follows several stages of which the salient ones are:
(1) Tracing the components of letters and later the letters proper with a stylus.
(2) Tracing the letters with a pencil.
(3) Tracing the letters with a pencil using the Write Right Tool.

The latter, due to the resistance offered by the tension plate D to the tip of the pencil, induces an exaggerated and determined effort of the child's hand, producing a more prominent and willed imitation of the letter-pattern, thus affording a decisive reversal of the optically reversed image of the letter that the eye naturally presents to the brain. Due to the eye lens, the image on the retina of the eye is similar to the inverted image thrown on the film by the lens of a photographic camera. Only early and emphasized reversal of the eye's image can produce this complicated and hard to evoke correction, impossible without following the principle of the Write Right Tool. When writing, the child vocalizes the names and phonetic properties of letters, which, together with construction of words, by the stimulated effort and enforced attention, induces the most active de facto reading and spelling process.

1 Claim, 6 Drawing Figures

WRITING AND KINESTHETIC TEACHING DEVICE

Figure 1:
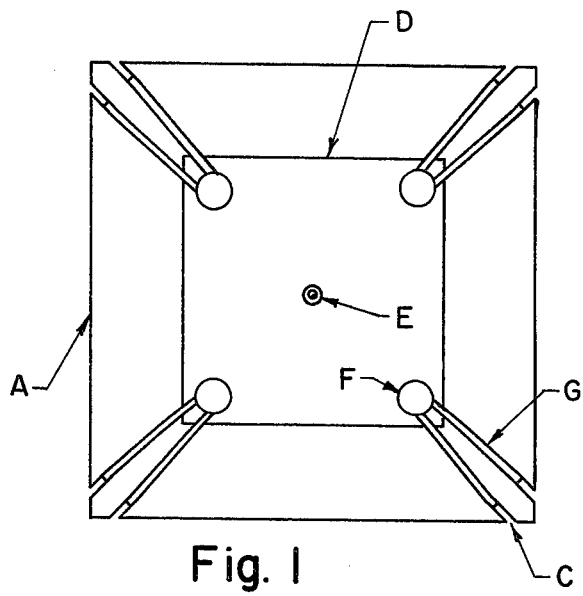
FIG. 1 is a plan view of the writing aid of this invention.
Figure 2:
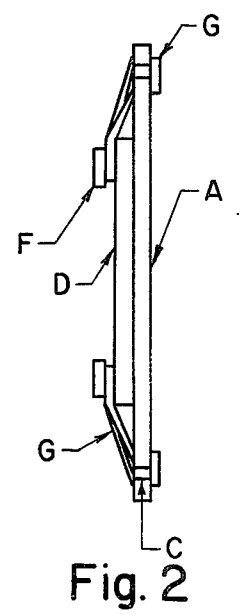
FIG. 2 is a side view of the writing aid of FIG. 1.
Figure 3:
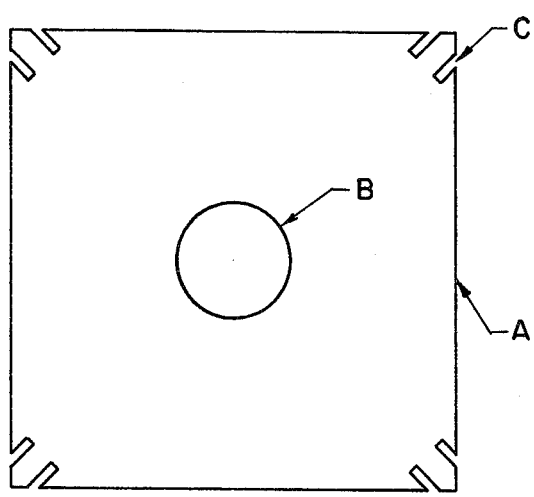
FIG. 3 is a plan view of the lower plate that forms part of the writing aid.
Figure 4:
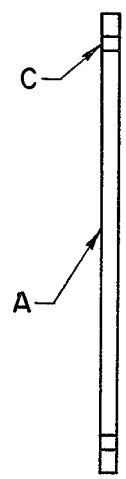
FIG. 4 is a side view of the plate of FIG. 3.
Figure 5:
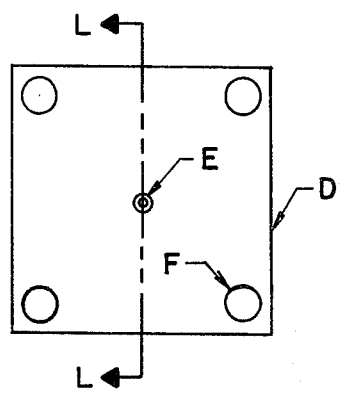
FIG. 5 is a plan view of the upper plate that forms part of the writing aid.
Figure 6:
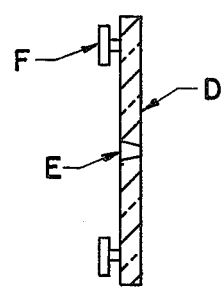
FIG. 6 is a section view taken along the line L—L of FIG. 5.

Different ages and class techniques may call for varied materials and details of the Write Right Tool design. The following description points out a generally useful and acceptable type of material and manufacturing.

The Plexiglas square A, 3 by 3 inches and one eighth of an inch in thickness, is provided with slots C in pairs on each of its corners. Rubber elastics of uniform lengths and thickness are inserted in these slots and are placed around the studs F on the corners of the square D. Choosing different thickness and length of the elastics allows for the variation of tension exerted on the pencil tip as it is inserted in the hole E. Weaker hands of very little children or stronger hands of older ones require some degree of differentiation. I use #8 Pioneer brand. Plate A has a central opening B which allows for the contact of the pencil tip with the letter to be traced. The average size of the opening B is three quarters of an inch diameter.

The upper plate D (1¾ inch square) also has a hole E in its center for the insertion of the tip of the pencil. This hole is of a truncated cone form with its narrower opening on the lower side of the plate D and the larger one on the upper side of this plate. This form allows a variation of the angle of the pencil's action in relation to the printed page. See section L—L.

The underside of the plate A, on each of its four corners, has the elastic bent from the slot to slot, thus resting the underside of this plate on the paper preventing a slippage of the tool while in operation.

An instruction book supplied with the tool helps in acquiring the right habits of penmanship and concentration.

GENERAL REMARKS

An average child is 5 to 6 years old when starting the reading study. By this time his kinesthetic, muscular-tactile, visual faculties are well formed; yet, the apperception related to the use of the alphabet, writing and structuring words, phonetic discernment, etc., is nil. Also, long before this age, children love to draw, crayon pictures, etc. If this early (age of 3) interest were to be utilized, this time would be ripe to start the study of writing in earnest. However, at this age; usually the child is not in school and, even if he or she were, the classwork would be impossible. There is a need of forceful, personal supervision by a teacher and/or a tool, the use of which would prevent the distortions which later would require discouraging and expensive remedial courses.

The way out, as in the case of the child learning to speak—by himself and early—is to expose him or her to a correct standard and let the natural action take place. This means to let the child trace the letters of upper case, about ⅜ inch high, making sure the action is accurate, that no pencil marks are seen on the white field around the letter, the pencil following strictly the black contour of the character being traced. To insure such an action and to create the illusion of "writing," together with the challenge of overcoming the resistance to the pencil motion, the above-described Write Right Tool is designed. It is a spur to will and personal responsibility, a "magnifying" agent able to deepen all correct writing muscular, visual and technical processes. In the same time, the letter names and their phonetic nature is fused with the flow of the word structuring, thus making the act of reading a by-product of writing and much more of an active and controlled occupation. This feature allows very little children to participate in small classes due to the accent on the possibility of individual drive and control by the young pupil himself.

The considerations of age, costs, production techniques, etc., may require a variation of detail of design without changing the basic principle of it. For instance, the lower plate A may be of opaque material, perhaps masonite; springs may be used instead of elastics; friction utilized, controlled by tension screws at corners of plate D. Also, plate D could be eliminated and the pencil inserted into a metal or plastic truncated cone to which four light chains would be attached, contacting four springs that are attached to the corners of plate A.

I claim:

1. A writing aid comprising;

a base, an opening in said base of a size to encompass a letter on an underlying sheet to be traced with a pencil;

a plate positionable over said base, a hole in said plate configured to receive the tip of said pencil; and means to position said plate over said base so that the hole in said plate overlies the opening in said base, said means comprising elastic resistance means for applying forces, equal in all directions parallel to said base, tending to keep said plate centered over said base in its rest position yet permitting said plate to be moved by said pencil in directions parallel to said base while tracing a letter on said underlying sheet against the forces of said resistance means.

* * * * *